United States Patent

Lim

[11] Patent Number: 5,128,600
[45] Date of Patent: Jul. 7, 1992

[54] METHOD FOR REMOVING EXCESS ELECTROLYTE FROM A NICKEL-CADMIUM CELL

[75] Inventor: Hong S. Lim, Agoura Hills, Calif.
[73] Assignee: Hughes Aircarft Company, Los Angeles, Calif.
[21] Appl. No.: 628,823
[22] Filed: Dec. 17, 1990
[51] Int. Cl.$^5$ ............................................. H01M 10/00
[52] U.S. Cl. ........................................... 320/2; 429/53; 429/57
[58] Field of Search .................. 320/2, 48; 429/53, 57, 429/58, 223, 226

[56] References Cited

U.S. PATENT DOCUMENTS 3,862,861  1/1975  McClelland et al. .................. 429/57
4,127,703  11/1978  Holleck ................................... 429/57

FOREIGN PATENT DOCUMENTS 0204472  11/1983  Japan ..................................... 429/53

Primary Examiner—Steven L. Stephan
Assistant Examiner—Kristine Peckman
Attorney, Agent, or Firm—Terje Gudmestad; Wanda K. Denson-Low

[57] ABSTRACT

Excess electrolyte fluid from a nickel cadmium battery cell is removed by a method in which the battery cells are overcharged to generate oxygen pressure which acts to force the excess fluid out of the cells. After the required amount of fluid is removed from the battery, the generated oxygen may be replaced to ensure proper operation of the finished battery.

10 Claims, 1 Drawing Sheet

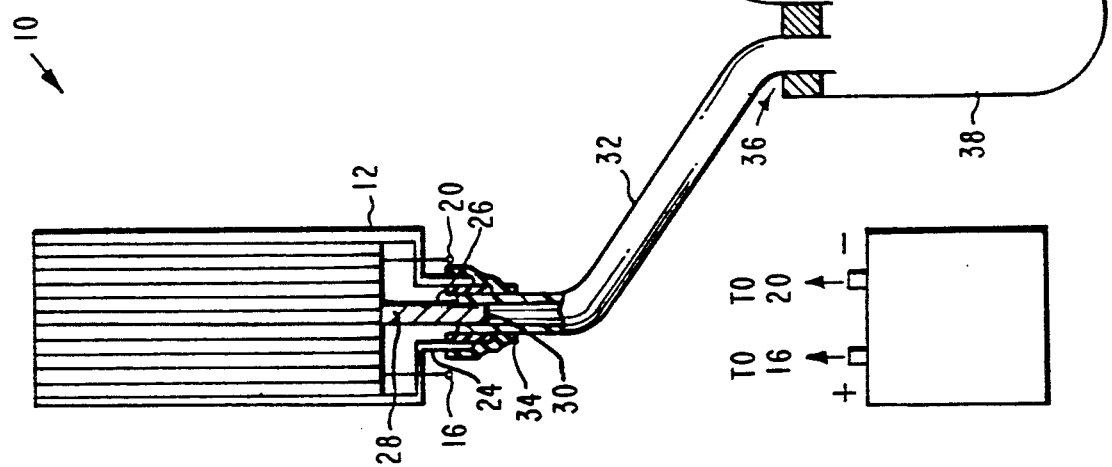
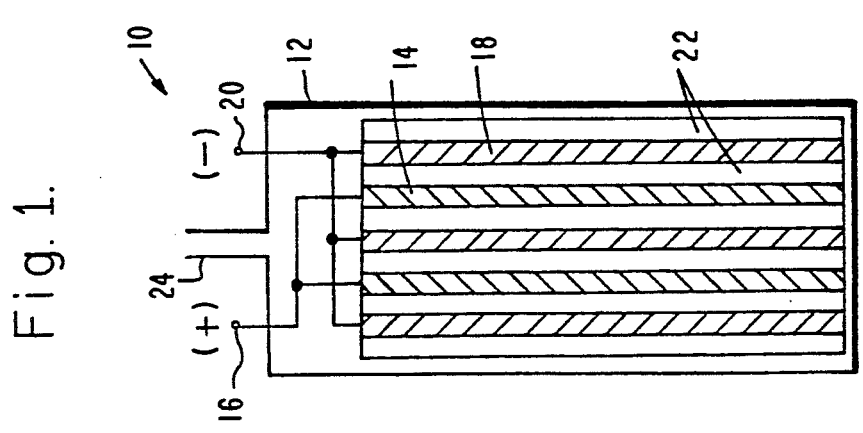

METHOD FOR REMOVING EXCESS ELECTROLYTE FROM A NICKEL-CADMIUM CELL

BACKGROUND

The present invention relates generally to nickel-cadmium storage batteries, and more particularly, to a method for removing excess electrolyte from such storage batteries during their manufacturing process.

Nickel-cadmium (Ni/Cd) batteries are an important energy storage device for small communication satellites, for example. In the manufacture of these batteries, and in particular hermetically sealed batteries, it is important that just the right amount of liquid electrolyte be added to each battery cell. Overfilling a cell, even by a small amount, interferes with the rapid recombination of gaseous oxygen, evolved during charging cycles, with the cadmium metal at the negative electrode. Such recombination is essential if the build-up of excessive gas pressure within the cell and permanent "bulge out" damage are to be avoided. Underfilling the cell can also result in reduced battery service life because of an insufficient amount of electrolyte in the separate between the anode and cathode of cell, a condition known as separator "dry out."

Typical present day nickel-cadmium batteries have separators made from either nylon or polypropylene felt material. In the manufacturing process for such batteries, overfilling of a cell, either by a mistake in estimating the amount of electrolyte required or by a manufacturing accident, can be corrected merely by inverting the battery and then charging it in this position, whereupon, under the force of gravity, the excess electrolyte liquid flows out through the fluid fill tube.

Recently, an improved design for these batteries has been introduced. In these "super" nickel-cadmium batteries, the felt separators have been replaced by a zirconia separator material. However, it has been found that because of the stronger capillary action exhibited by the zirconia separators, the above-mentioned technique used for correcting the overfilling problem has not been effective.

It is therefore an objective of the present invention to provide a technique and method which enables the removal of an excess electrolyte from nickel-cadmium and super nickel-cadmium battery cells.

SUMMARY OF THE INVENTION

The present invention is a novel method that provides for the removal of electrolyte from cells of a nickel-cadmium battery by utilizing oxygen gas that is generated by charging the cell and employing capillary action to remove the electrolyte to a graduated receiving vessel. The method of removing excess electrolyte from an overfilled nickel cadmium battery comprises the following steps.

The first step comprises connecting the overfilled nickel cadmium battery cell to a graduated receiving vessel for electrolyte collection and to a gas volume measuring cylinder. This is associated by way of a porous filter which is partially disposed in a flexible tube that fits tightly to the fill tube and that is adapted to pass electrolyte under pressure. The second step comprises charging the overfilled nickel cadmium battery at a predetermined rate and for a predetermined time period. The third step comprises overcharging the overfilled nickel cadmium battery to cause oxygen to be generated. The overcharging rate is typically a rate between about ½ and 1/10 of a rate C that is defined to be the rate of charge at which the battery is fully charged from a fully discharged state in one hour. As a result of the above steps, the excess amount of electrolyte is first collected in the capillary of the porous filter. It is then pushed out of the battery cell by the pressure of the generated oxygen, through the capillary of the porous filter and then the flexible tube into the graduated cylinder where the amount of removed electrolyte can be read directly.

The amount of oxygen escaping from the battery cell during the fluid removal process can also be measured simply by collecting the gas in the volume measurement cylinder. The above method also comprises the step of compensating for the oxygen lost from the cell during the overcharging step by adding fresh oxygen in substantially the same amount as the amount which escaped from the cell during the overcharging step.

BRIEF DESCRIPTION OF THE DRAWINGS

The various features and advantages of the present invention may be more readily understood with reference to the following detailed description taken in conjunction with the accompanying drawing figures, wherein like reference numerals designate like structural elements, and in which:

FIG. 1 illustrates an exemplary nickel-cadmium battery cell in which the electrolyte removal method of the present invention may be employed; and FIG. 2 is a diagram useful in illustrating the electrolyte removal method of the present invention.

DETAILED DESCRIPTION

The present invention is a method for removing excessive electrolyte from the cells of both conventional nickel-cadmium batteries, which use nylon, or polypropylene felt separators, and "super" nickel-cadmium battery cells, which use zirconia separators. Although presently available electrolyte removal methods may be applicable to battery cells containing nylon or polypropylene felt separators, the method of the present invention offers significant advantages, including easy and facile removal and monitoring of electrolyte and oxygen volumes.

The structure of a typical, exemplary nickel-cadmium battery cell 10 is shown in FIG. 1. As shown therein, the battery cell 10 comprises a case 12, a plurality of positive nickel electrodes 14 which are connected to a positive cell terminal 16 and a substantially equal number of negative cadmium electrodes 18, which are connected to a negative terminal 20. The electrodes are separated from each other and from the case 12 by a plurality of separators 22. The combination of electrodes 14, 18 and separators 22 are known collectively as a cell stack. The fluid electrolyte in these batteries is about a 25 to about a 35% solution of a soluble alkali metal hydroxide, preferably potassium hydroxide which is admitted into the cell through filler tube 24, which is welded onto the case 12 of the battery cell 10 so as to permit the leak-free transfer of electrolyte fluid into the interior thereof.

The electrochemical reaction in the Ni/Cd battery cell 10 can be represented by the following reaction: $2 Ni(OH_2 + Cd(OH)_2 = 2 NiOOH + Cd + 2 H_2O$. In this reaction, water is generated when the battery cell is charged and consumed when it is discharged, at a rate of about 0.67 grams/ampere-hour. As a result, it is easier to remove any excess water electrolyte when cell is fully charged than when it is discharged.

A schematic diagram of an exemplary system illustrating the electrolyte removal method of the present invention is shown in FIG. 2. In FIG. 2, the filler tube 24 further contains a roll of course grade filler paper 26, a first portion 28 of which is inserted through the end of the filler tube 24 into the interior of case 12 for a distance sufficient to make contact with the topmost portion of the cell stack therein. A second portion 30 of the filter paper 26 fits into a first transfer tube 32, which may be made of any inert material but is preferably comprised of teflon or a similarly non-reactive, flexible polymeric material, such as polypropylene or polyethylene. The end of the first transfer tube 32 is preferably wrapped with a length of a soft teflon sealing tape 34 so that it fits snugly inside of the filler tube 24 and forms a gas tight seal. Sealing the system at this point may be enhanced by also wrapping the tip end of the filler tube 24 within an additional length of the soft teflon sealing tape (not shown).

The opposite end of the first transfer tube 32 is connected to an inlet 36 of a closed graduated receiving vessel 38 which is used to collect excess electrolyte removed from the cell and to measure its volume. The vessel 38 is further coupled through an outlet 40 and a second transfer tube 42, that is also preferably comprised of teflon or a similarly nonreactive material, to a gas volume measurement cylinder 44. The gas volume measurement cylinder 44 contains a liquid 46, such as water, for example, which is disposed in a manner so as to isolate the volume of any gas therein from the remainder of the system. The exemplary system illustrated in FIG. 2 therefore allows monitoring both the volume of electrolyte removed from the interior of the cell stack within the case 12 and the volume of gas escaping therefrom during electrolyte fluid removal at the same time.

In the operation of the method of the present invention, after sealing the battery case 12 except for the filler tube 24, a power supply 48 is connected to the positive and negative terminals 16 and 20, and the battery cell 10 is first charged. To remove excess electrolyte fluid from the interior of the battery, the battery cell 10 is then overcharged at a rate sufficient to cause the slow evolution of oxygen bubbles. The overcharging rate is typically between about ½ and about 1/10 of the C rate (as defined above), and preferably between about ½ and 1/5, of the C rate. These bubbles, which first form in pores of the cell stack, act to push excess electrolyte fluid first to the topmost surface of the stack where it is absorbed by the filter paper 26. Then, as the pressure of the emitted oxygen gas builds up, the absorbed liquid electrolyte is pushed first through the pores of the filter paper 26, and then through the first transfer tube 32 to the closed graduated receiving vessel 38. The overcharging step is continued until the desired amount of electrolyte fluid has been removed from the battery cell 10. As the overcharging continues, oxygen gas also comes out of the cell case 12 with the electrolyte fluid. This exits the graduated receiving vessel 38 through the outlet 40 and the second transfer tube 42 to the gas measuring cylinder 44, where its volume is quantitatively measured.

In a second embodiment of the present invention, a measured quantity of oxygen substantially equal to the amount removed during the overcharging step is added back into the battery cell 10 after completion of the electrolyte removal process after which the filler tube 24 is sealed. With this, the battery is now ready for final use. Oxygen replacement is very important since, if it were not done, the amount of precharge will be increased by an amount determined by the quantity of oxygen lost and the amount of overcharge protection of the battery cell 10 will be reduced proportionately. The balance of these two quantities is important for a long operating life of the cell.

EXAMPLE

About 32 cells of a super nickel-cadmium battery were each overfilled with approximately 3 to 6 milliliters of KOH electrolyte. During a conventional inverted charging phase, none of the excess electrolyte flowed out of the battery cell 10, and the pressure in many of the cells reached the maximum allowable case design internal pressure for these batteries (85 psig) even before the charging operation was completed. To remove this excess fluid and salvage the cells, the cells were connected in the manner illustrated in FIG. 2 and fully charged at ½ the C rate. The rates were then overcharged at about 1/5 to about 1/10 of the C rate. After about 15 to about 60 minutes, depending on the amount of excess electrolyte fluid in each cell, drops of fluid were visible inside of the first transfer tube 32. After a time of between about 2 and about 6 hours of overcharging at this rate, between about 3 and about 6 milliliters of electrolyte fluid were removed from each of the cells. After removal of the electrolyte and the subsequent replacement of the oxygen evolved during the overcharging, all cells showed acceptable pressures on charge.

Thus there has been described a new and improved method for removing excess electrolyte fluid from a nickel-cadmium battery during its manufacture. It is to be understood that the above-described embodiment is merely illustrative of some of the many specific embodiments which represent applications of the present invention. Clearly, numerous other arrangements can be readily devised by those of skill in the art without departing from the spirit of the invention and all changes which come within the scope and equivalency of the appended claims are intended to be embraced therein.

What is claimed is:

1. A method of removing excess electrolyte fluid from an overfilled battery cell of a nickel cadmium battery, said method comprising the steps of:
    sealingly connecting the overfilled nickel cadmium battery cell to a collection vessel with a porous filter arrangement disposed therebetween;
    charging the overfilled nickel cadmium battery cell at a predetermined rate and for a predetermined time period;
    overcharging the overfilled nickel cadmium battery cell to cause oxygen to be generated, the pressure created by the generated oxygen forcing the excess electrolyte fluid out of the battery cell and through the porous filter arrangement and into said collection vessel, and
    measuring the volume of oxygen exiting the nickel cadmium battery during the overcharging step.

2. The method of claim 1 wherein the step of measuring the volume of oxygen exiting the nickel cadmium battery cell is accomplished using a gas volume measurement cylinder.

3. The method of claim 2 which further comprises the step of adding oxygen to the nickel cadmium battery cell in an amount substantially equal to the amount of oxygen that was removed during the overcharging step.

4. The method of claim 1 wherein the rate of overcharging is between ½ and 1/10 of a rate C that is defined to be the rate of charge at which the battery is fully charged from a fully discharged state in one hour.

5. The method of claim 1 wherein the rate of overcharging is between ½ and 1/5 of a rate C that is defined to be the rate of charge at which the battery is fully charged from a fully discharged state in one hour.

6. A method of removing excess electrolyte from an overfilled nickel cadmium battery cell, said method comprising the steps of:
   sealingly connecting the overfilled nickel cadmium battery cell to a graduated collection vessel with a porous filter arrangement disposed therebetween;
   charging the overfilled nickel cadmium battery cell at a predetermined rate and for a predetermined time period;
   overcharging the overfilled nickel cadmium battery cell to cause oxygen to be generated, the rate of overcharging being between ½ and 1/10 of a rate C that is defined to be the rate of charge at which the battery is fully charged from a fully discharged state in one hour, for a time sufficient for oxygen pressure to force excess electrolyte out of the battery cell into and through the porous filter arrangement and into the graduated collection vessel, and
   measuring the volume of oxygen removal during the overcharging step.

7. The method of claim 6 wherein the step of measuring the volume of oxygen exiting the nickel cadmium battery cell is accomplished using a gas volume measurement cylinder.

8. The method of claim 6 which further comprising the step of:
   adding oxygen to the nickel cadmium battery cell in an amount equal to the amount of oxygen that was removed during the overcharging step.

9. The method of claim 6 wherein the rate of overcharging is between about ½ and about 1/5 of the rate C.

10. A method for removing excess electrolyte from an overfilled nickel cadmium battery, said method comprising the steps of:
   sealingly connecting the overfilled nickel cadmium battery to a graduated collection vessel with a porous filter arrangement disposed therebetween;
   charging the overfilled nickel cadmium battery cell at a predetermined rate and for a predetermined time period;
   overcharging the overfilled nickel cadmium battery at a rate between ½ and 1/10 of a rate C that is defined to be the rate of charge at which the battery is fully charged from a discharged state in one hour, and for a time sufficient to generate oxygen, and for the oxygen pressure to force excess electrolyte out of the battery into and through the porous filter arrangement and into the graduated collection vessel; and
   adding oxygen to the nickel cadmium battery in an amount substantially equal to the amount of oxygen removed during the overcharging step.

* * * * *